US006987980B1

(12) United States Patent
Hans et al.

(10) Patent No.: US 6,987,980 B1
(45) Date of Patent: Jan. 17, 2006

(54) TRANSMISSION FRAME AND RADIO UNIT FOR TRANSMITTING SHORT MESSAGES WITH DIFFERENT DATA FORMAT

(75) Inventors: Martin Hans, Hildesheim (DE); Frank Kowalewski, Salzgitter (DE); Holger Schulz, Berlin (DE); Ralf Fischer, Bad Salzdeltfurth (DE); Gunnar Schmidt, Wolfenbuettel (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/857,805

(22) PCT Filed: Oct. 16, 1999

(86) PCT No.: PCT/DE99/03328

§ 371 (c)(1),
(2), (4) Date: Jun. 11, 2001

(87) PCT Pub. No.: WO00/35214

PCT Pub. Date: Jun. 15, 2000

(30) Foreign Application Priority Data

Dec. 8, 1998 (DE) ........................................ 198 56 440

(51) Int. Cl.
*H04Q 7/08* (2006.01)
*H04Q 7/20* (2006.01)

(52) U.S. Cl. ...................... 455/466; 455/38.1; 370/313; 370/825.03; 379/57

(58) Field of Classification Search ................. 455/466, 455/434, 414.3, 458, 38.1; 340/7.1, 7.43, 340/7.48; 370/473, 474, 313, 825.03, 829, 370/85.6; 379/57, 59, 60
See application file for complete search history.

(56) References Cited

U.S. PATENT DOCUMENTS 4,864,532 A * 9/1989 Reeve et al. .................. 710/53
5,379,292 A * 1/1995 Kurata et al. ............... 370/216
5,412,719 A 5/1995 Hamamoto et al.

(Continued)

FOREIGN PATENT DOCUMENTS

| | | |
|---|---|---|
| DE | 198 56 440 | 6/2000 |
| EP | 1 138 162 B1 | 8/2003 |
| WO | 97/26765 | 7/1997 |
| WO | 98 34422 A | 8/1998 |
| WO | 00/35214 | 6/2000 |

OTHER PUBLICATIONS

Colleseis et al:"Short Message Service Based Applications . . . ", IEEE International Symposium on Personal, Indoor and Mobile Radio, BD. 3, Sep. 18, 1994.

(Continued)

*Primary Examiner*—Jean Gelin
*Assistant Examiner*—Julio Perez
(74) *Attorney, Agent, or Firm*—Michael J. Striker

(57) ABSTRACT

A transmission frame and a telecommunications device (60, 65, 70) having a transmission frame (1) are proposed, which are used to transmit short messages (5) in a telecommunications network (10), in particular in a radiotelecommunications network. By means of the transmission frame (1), especially flexible transmission of short messages (5) in the telecommunications network (10) is possible. At least two data fields (15, 20, 25, 30) are provided. Data of a short message (5) are stored in memory in the data fields (15, 20, 25, 30). Data in a first data format are stored in a first data field (15), and data in a second data format, different from the first data format, are stored in a second data field (20).

9 Claims, 1 Drawing Sheet

U.S. PATENT DOCUMENTS

| | | | | | |
|---|---|---|---|---|---|
| 5,652,783 | A | * | 7/1997 | Keba et al. | 370/313 |
| 5,734,645 | A | | 3/1998 | Raith | |
| 5,793,756 | A | * | 8/1998 | Ayerst et al. | 370/311 |
| 5,896,376 | A | * | 4/1999 | Alperovich et al. | 370/348 |
| 6,085,072 | A | * | 7/2000 | Komiya | 455/83 |
| 6,188,909 | B1 | * | 2/2001 | Alanara et al. | 455/466 |
| 6,212,176 | B1 | * | 4/2001 | Andersson et al. | 370/347 |
| 6,292,668 | B1 | * | 9/2001 | Alanara et al. | 455/466 |
| 6,400,958 | B1 | * | 6/2002 | Isomursu et al. | 455/466 |
| 6,421,527 | B1 | * | 7/2002 | DeMartin et al. | 455/67.13 |
| 6,529,717 | B1 | * | 3/2003 | Blants et al. | 455/186.1 |

OTHER PUBLICATIONS

Ahmed Patel et al: "A Technique for Multi–Network Access to . . . " In Computer Communications 20 (1997), pp. 324–337.

N. Freed: "Multipurse Internet Mail Extensions (MIME) Part One" Network Working Group, Nov. 1996, pp. 1–31.

N. Freed et al: "Multipurpose Internet Mail Extensions (MIME) Part Two: Media Types", Network Working Group, Nov. 1996, pp. 1–44.

N. Borenstein et al: "MIME (Multipurpose Internet Mail Extensions) Part One: Mechanisms for Specifying and Describing the Format of Internet Message Bodies", Network Working Group, Sep. 1993, pp. 1–81.

CEMIL Betanov: "Introduction to X.400", Artech House Boston, London, 1993, pp. 1, 10–11, 16–25, 120–121, 124–127.

Seh–Joon Dokko, et al: "Development of Multimedia E–Mail System..." IEEE 1997, pp. 494–498.

Report of the Firm Computer Technik und Grafik, Feb. 2, 1998.

Owner's Manual for Nokia 90001 Communicator 1995–1997 Nokia Mobile Phones.

* cited by examiner

TRANSMISSION FRAME AND RADIO UNIT FOR TRANSMITTING SHORT MESSAGES WITH DIFFERENT DATA FORMAT

BACKGROUND OF THE INVENTION

The invention is based on a transmission frame and a telecommunication device having the transmission frame.

Short message services for transmitting short messages are already known. The short message services serve to send a short message to a subscriber of a telecommunications network without requiring that a telecommunications connection to the subscriber be made beforehand. This is of particular interest in mobile radio systems, since subscribers in such systems are often unreachable. Incoming short messages are stored in memory by a network operator of the telecommunications network and forwarded to the intended subscriber at a later time. The subscriber is informed of the arrival of a short message intended for him so that he can download the short message from the network operator.

One example of a short message service is the Short Message Service (SMS) using the GSM Standard (Global System for Mobile Communications). This short message service predetermines a transmission frame for transmitting a short message of up to 160 7-bit ASCII (American Standard Code for Information Interchange) text characters.

Transmitting longer texts is possible with the aid of chained short messages. With the aid of this short message service, it is possible to produce and read the short messages even using simple mobile radio terminals. Since by the GSM Standard provision is made only for text transmission for the short messages, if binary data, such as audio data, image data or the like, are to be transmitted, they would have to be converted into the text format and converted back again into the binary format after being received.

SUMMARY OF THE INVENTION

The transmission frame of the invention and the telecommunications device of the invention have the advantage over the prior art that at least two data fields are provided; that data of a short message are stored in memory in the data fields; and that data in a first data format are stored in a first data field, and data in a second data format, different from the first data format, are stored in a second data field. In this way, a short message that includes different types of data can be transmitted in a single transmission frame. Thus different media, such as text data, audio data and image data, can be integrated into a single short message in a simple way, making it possible to form a multimedia short message.

A further advantage is that the transmission frame is not limited in its length; instead, arbitrary data fields can be transmitted, lined up with one another, in the transmission frame.

Another advantage is that by lining up the data fields, a simple separation or downloading of the data of a single data field or medium having text, audio, or image data is made possible. Since thus only the actually required part of the short message has to be downloaded by the network operator of the telecommunications network, an economy of transmission capacity can be achieved.

By the provisions recited in the dependent claims, advantageous refinements of and improvements to the transmission frame defined by independent claim 1 are possible.

It is especially advantageous that a first ID code, which identifies the makeup and/or the content of the short message, is provided in the first data field. In this way, a subscriber to whom the short message is addressed can be informed especially easily of the makeup and/or content of the short message if the network operator of the telecommunications network transmits merely the first data field to the intended subscriber. Based on this information, the intended subscriber can then decide which parts of the data fields of the short message he would like to download from the network operator of the telecommunications network.

Another advantage is that the first data field is limited in its size to a predetermined value. Thus even a subscriber with limited storage capacity for receiving short messages can be informed of the makeup and/or content of the entire short message by transmission of the first data field.

Another advantage is that the total length of the short message is not limited.

It is also advantageous that in each of at least two data fields, one data-field-specific ID code, which identifies the makeup and/or content of the corresponding data field, is provided per data field. In this way, a notice about the makeup and/or content of the entire short message can also be generated by combining all the data-field-specific ID codes and sending them to the intended subscriber, so that the first data field, above all in the case of a size limitation, will not be overfilled with ID code data.

By means of the data-field-specific ID code, the intended subscriber on downloading the associated data field from the network operator can be informed still more precisely about this data field and can thus better adapt a playback of the data transmitted with the data field to his own playback capabilities.

It is especially advantageous that the data stored in the first data field are present in a data format that is readable by all the subscribers of the telecommunications network. In this way, short messages can be sent at least in part to all the subscribers of the telecommunications network. Furthermore, all the subscribers can at least be informed of the short messages on hand in the network operator, even if they are unable to read certain data fields of the short message intended for them.

BRIEF DESCRIPTION OF THE DRAWINGS

One exemplary embodiment of the invention is shown in the drawing and described in further detail in the ensuing description.

DESCRIPTION OF THE PREFERRED EMBODIMENTS

Figure 1:
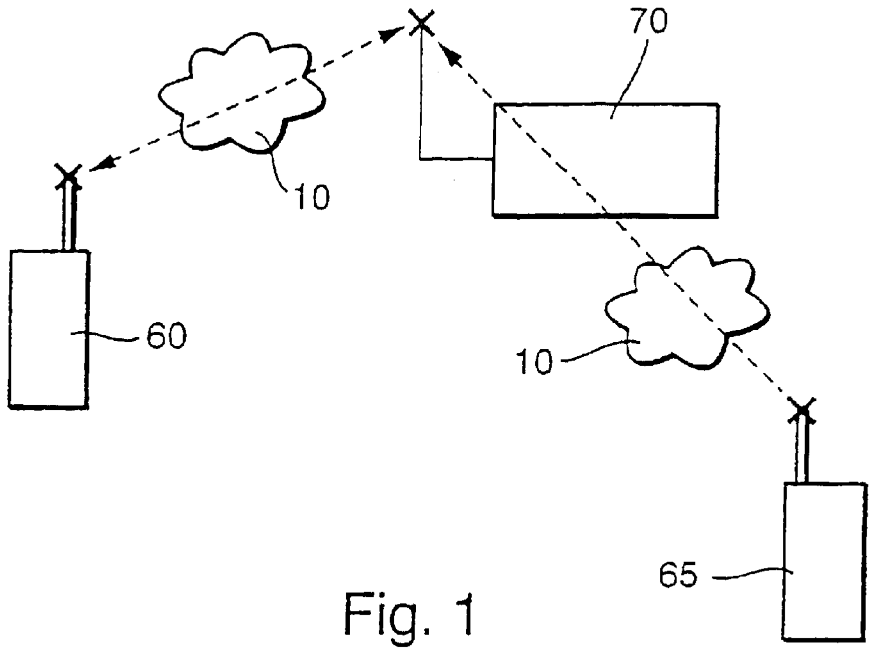
FIG. 1 shows a block circuit diagram for transmitting short messages in a telecommunications network.

In FIG. 1, 60 designates a first subscriber and 65 a second subscriber of a telecommunications network 10, which is embodied in particular as a radiotelecommunications network, for example as a mobile radio network. The first subscriber 60 and the second subscriber 65 are each embodied as a telecommunications device, in particular as a radio unit, for example as a mobile radio device, service radio device, as a radio handset, or the like. In FIG. 1, a network operator 70 of the telecommunications network 10 is also shown; it can also be embodied as a telecommunications device, and in particular as a radio unit.

In the second subscriber 65, a short message 5 for the first subscriber 60 is prepared and is broadcast, suitably addressed, to the network operator 70 via the telecommunications network 10. The network operator 70 stores the short message 5 in memory and sends a message to the first subscriber 60 informing the subscriber about the presence of a short message 5 addressed to it. This message can be sent to the first subscriber 60 for example once the network operator 70 ascertains an activation of the first subscriber 60. If after receiving the aforementioned message the first subscriber 60 asks the network operator 70 to transmit the short message 5, then the network operator 70 first sends a notice to the first subscriber 60 that informs the first subscriber 60 of the makeup and/or content of the short message 5. The first subscriber 60 can then download the short message 5 either partially or entirely from the network operator 70, so that the short message 5 is transmitted partially or completely by the network operator 70 to the first subscriber 60.

Figure 2:
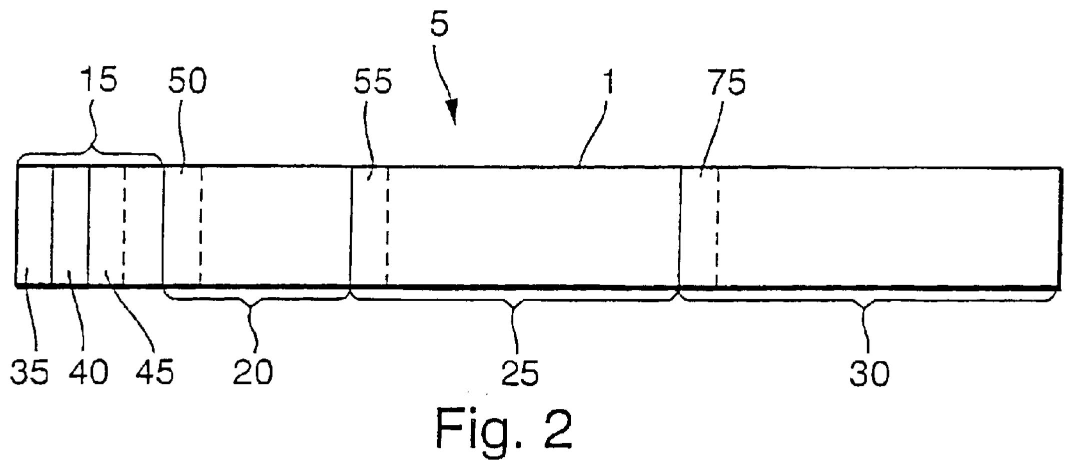
FIG. 2 shows a general makeup of a transmission frame.

In FIG. 2, the makeup of a short message 5 of this kind is shown. The short message 5 is transmitted in a transmission frame 1 from the second subscriber 65 to the network operator 70. The transmission frame 1 includes a first data field 15, a second data field 20, and optionally a third data field 25 and a fourth data field 30. The first data field 15 includes a first ID code 35, which identifies the makeup of the short message 5. In addition, a second ID code 40, which identifies the content of the short message 5, can be provided in the first data field 15. The first ID code 35 and the second ID code 40 can also be combined into a single ID code that identifies the makeup and/or content of the short message 5. Also stored in the first data field 15 are data in a first data format. In the second data field 20, data in a second data format, different from the first data format, are stored. Data whose data format can differ from the data format of the first data field 15 or the second data field 20, but need not necessarily do so, are also stored in the optionally present further data fields 25, 30.

If more than two data fields are provided in the transmission frame 1, then data in different formats are stored at least in two of the data fields, but the position of these data fields in the transmission frame 1 does not matter.

Dashed lines in FIG. 2 indicate that the first data field 15 can additionally include a first data-field-specific ID code 45, which identifies the makeup and/or content of the first data field 15. Correspondingly, the second data field 20 can include a second data-field-specific ID code 50, which identifies the makeup and/or content of the second data field 20. The third data field 25 can correspondingly include a third data-field-specific ID code 55, which identifies the makeup and/or content of the third data field 25, and the fourth data field 30 can include a fourth data-field-specific ID code 75, which identifies the makeup and/or content of the fourth data field 30.

The first ID code 35 can include indications about the number of data fields 15, 20, 25, 30 in the short message 5. In addition or as an alternative, the first ID code 35 can include data about the data formats of the data stored in the data fields 15, 20, 25, 30. In addition or alternatively, indications about the size of the data fields 15, 20, 25, 30 can be included in the first ID code 35. In that case, the second ID code 40 can include indications about the type of data stored in the data fields 15, 20, 25, 30. For instance, the second ID code 40 can include indications as to whether audio data or image data are stored in a data field.

It can now be provided that the network operator 70, upon the request of the first subscriber 60, will forward the first data field with the first ID code 35 and the second ID code 40 to the first subscriber 60, so that on the basis of the information, transmitted in the first ID code 35 and the second ID code 40, about the makeup and/or content of the short message 5, the first subscriber 60 can check which data fields of the short message 5 it is capable, on the basis of 20, its functionality, of downloading and/or playing back from the network operator 70. Also in the first subscriber 60, a decision can be made as to which of the readable data fields of the short message 5 are to be downloaded at all from the network operator 70, if not all the readable data fields of the short message 5 are of interest to the first subscriber 60, for the sake of economy of transmission capacity. If by the request of the first subscriber 60 the entire first data field 15 with the first ID code 35 and the second ID code 40 is to be transmitted to the first subscriber 60, then it should as much as possible be assured that the data stored in the first data field 15 are in a data format that is readable by all the subscribers of the telecommunications network 10. This is true particularly whenever the data stored in the first data field 15, together with the data in the first ID code 35 and in the second ID code 40, are in a text format; the SMS (Short Message Service) format by the GSM Standard (Global System for Mobile Communications), for instance, is attractive, since it is readable, in a telecommunications network embodied by the requirements of the GSM system, by the subscribers or mobile radio devices of this subscriber that are embodied by the GSM Standard. Then the first data field 15 can correspond to the data field already prescribed for the SMS by the GSM Standard and can be limited in its size to the 160 7-bit ASCII (American Standard Code for Information Interchange) text characters. The other data fields 20, 25, 30 need not be limited in their size.

A further data format for the first data field 15, which is likewise readable, as an alternative to the text format, by all the subscribers of the telecommunications network 10, is the binary encoding of references to entries in tables of the kind that contain known data formats and are known to all the subscribers of the telecommunications 20, network 10.

At least some of the data stored in the first data field 15, such as the data of the first ID code 35 and/or the data of the second ID code 40, in that case comprise binary-encoded values that represent the indices of the table entries. In the tables, known data types and/or data formats, such as audio and/or video formats, are assigned to these indices.

The data-field-specific ID codes 45, 50, 55, 75 can also include indications about the data formats in the respective associated data field 15, 20, 25, 30 and/or about the size of the respective associated data field 15, 20, 25, 30 and/or about the type of data in the respective data field 15, 20, 25, 30. If it is agreed that the data in the first data field 15 are in the GSM-SMS text format, and this data field is limited for instance to 160 7-bit ASCII text characters, then the first data-field-specific ID code 45 can also be omitted. It can be provided that only data in a single data format are stored in each data field 15, 20, 25, 30. However, it can also be provided that in at least one of the data fields, data in a plurality of data formats are stored, in particular in the second data field 20 and/or optionally in one or more further data fields 25, 30. Naturally, it can also be provided that the short message 5 includes more than the four data fields shown in FIG. 2.

It can also be provided that the notice from the network operator 70 to the first subscriber 60, in response to the request by the subscriber to the network operator 70, about the makeup and/or content of the short message 5 is prepared by evaluation of the data-field-specific ID codes 45, 50, 55,

75 and is then sent to the first subscriber 60, 20 so that in this case, the first ID code 35 and the second ID code 40 are not needed, and the first data field 15 does not have to be sent to the first subscriber 60, either. The notice, generated in this way, about the makeup and/or content of the short message 5 can, however, also be sent to the first subscriber 60 in a data format that is readable by all the subscribers of the telecommunications network 10; for that purpose, once again, the GSM-SMS text format, using a data field with 160 7-bit ASCII text characters, can for instance be provided in particular.

Figure 3:
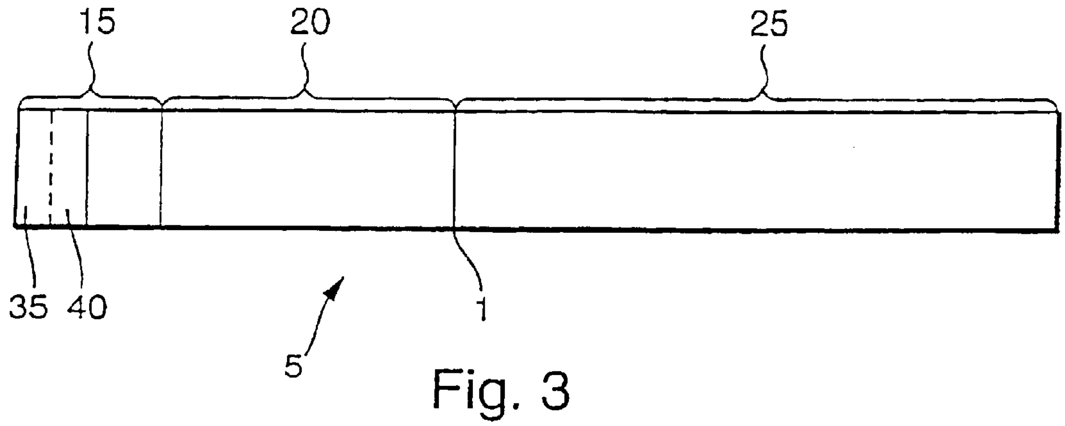
FIG. 3 shows one concrete example of a makeup of a transmission frame.

A concrete example of a transmission frame 1 for a short message 5 will now be described in conjunction with FIG. 3. The short message 5 is embodied as a multimedia short message. In FIG. 3, identical reference numerals identify the same elements as in FIG. 2. According to FIG. 3, the first data field 15, second data field 20 and third data field 25 are provided in the transmission frame 1. No data-field-specific ID codes are provided in the individual data fields 15, 20, 25. The first data field 15 includes text data in the ASCII text format; the second data field 20 includes audio data, for instance in the WAV (Wave) format; and the third data field 25 includes image data, for instance in the GIF format (Graphic Interchange Format). The first data field 15 with the text data is text-formatted in accordance with the GSM-SMS. A dashed line between the first ID code 35 and the second ID code 40 in FIG. 3 indicates that the first ID code 35 and the second ID code 40 can be combined into one common ID code. This kind of common ID code 35, 40 indicates both the number of data fields 15, 20, 25 and the content and size of the second data field 20 and third data field 25. Hence the common ID code 35, 40 can look like this:

"Multipart/2/Audio/7654/Image/12345".

This common ID code 35, 40 states that what is involved is a short message from a plurality of data fields, as indicated by the code word "Multipart". The numeral "2" indicates that besides the first data field 15, which is always present, having the text data and a length of 160 7-bit ASCII text characters, there are also two further data fields 20, 25 in the transmission frame 1 of the short message 5. "Audio" is named as the first data type in the common ID code 35, 40; thus the common ID code 35, 40 tells that the data stored in the second data field 20 are audio data. The second data type is named "Image" in the common ID code 35, 40; thus the common ID code 35, 40 tells that the data stored in the third data field 25 are image data.

Following the data type in the common ID code 35, 40 is the size of the associated data field 20, 25 in each case, so that the common ID code 35, 40 tells both the length of an audio file having the audio data, transmitted in the second data field 20, which is 7654 bytes, and the length of an image file with the image data, transmitted in the third data field 25, which is 12345 bytes. For the first data field 15, no indications are required in the common ID code 35, 40, since in the example described, it always includes text data, which are compatible with the GSM-SMS text format and which are limited in number to 160 7-bit ASCII text characters. Provision can additionally be made so that the common ID code 35, 40 also indicates the data format for the data in the second data field 20 and in the third data field 25. For the audio data in the second data field 20, the WAV format could then be indicated as a data format in the common ID code 35, 40. For the image data in the third data field 25, the GIF format could be indicated as the data format in the common ID code 35, 40. However, it is also possible that the indications "Audio" and "Image" of the aforementioned common ID code 35, 40 simultaneously describe the content and the format of the data stored in the corresponding data fields 20, 25 as well, in which case it is then a prerequisite that audio data always be present in a predetermined format, such as the WAV format, and image data also always be present in predetermined format, such as the GIF format, in the corresponding data field of the transmission frame 1.

As described, it is also possible to encode the data type and/or the data format by way of tables known to all the subscribers of the telecommunications network 10, for instance by means of a binary code. In a first table for data types, the data type "Text Data" can for instance be assigned a numeral "1", the data type "Audio Data" can be assigned the numeral "2", the data type "Image Data" can be assigned the numeral "3", and the data type "Video Data" can be assigned the numeral "4", and the numerals can be suitably binary-encoded. In a second table for data formats of the data type "Audio Data", the data format "WAV" can for instance be assigned the numeral "1", the data format "G.723" can be assigned the numeral "2", the data format "G.728" can be assigned the numeral "3", the data format "MPEG-Audio" (MPEG stands for Motion Picture Expert Group) can be assigned the numeral "4", and the data format "AMR" (Adaptive Multi Rate) can be assigned the numeral "5"; once again, these numerals can be suitably binary-encoded. In a third table for data formats of the data type "Image Data", the data format "GIF" can for instance be assigned the numeral "1", the data format "JPEG" (Joint Picture Expert Group) can be assigned the numeral "2", and the data format "BMP" (Bitmap) can be assigned the numeral "3", and again these numerals can be suitably binary-encoded.

In that case, the common ID code 35, 40 could look like this:

2/2/1/3/1

This common ID code 35, 40 makes the same statement as the one described above in text format. Here the first numeral "2" of the common ID code 35, 40 stands for the number of data fields present, in addition to the first data field 15, in the transmission frame 1 of the short message 5. The second numeral "2" of the common ID code 35, 40 refers, within the first table for data types, to the data type "Audio Data" and thus states that audio data are stored in the second data field 20. The third numeral "1" in the common ID code 35, 40 refers within the second table for data formats of the data type "Audio Data" to the "WAV" data format and states that the data stored in the second data field 20 are in the "WAV" data format. The fourth numeral "3" of the common ID code 35, 40 refers within the first table for data types to the data type "Image Data" and thus states that image data are stored in the third data field 25. The fifth numeral "1" in the common ID code 35, 40 refers within the third table for data formats of the data type "Image Data" to the "GIF" data format and states that the data stored in the third data field 25 are in the "GIF" data format.

Based on the common ID code 35, 40 transmitted to the first subscriber 60, a decision can be made in the first subscriber whether it makes sense at all or is wanted to download the second data field 20 and/or the third data field 25 from the network operator 70. If the first subscriber 60 lacks audio capacity, or in other words has no capability of processing or playing back audio data, then it makes no sense to download the audio data from the second data field 20 from the network operator 70. If the first subscriber 60 has no image capability, that is, image data cannot be processed or played back in the first subscriber 60, then again it makes no sense to download image data from the third data field 25 from the network operator 70.

For selecting the data fields of the transmission frame 1 of the short, message 5 that are to be downloaded from the network operator 70, provision can be made for displaying the common ID code 35, 40 on a display device of the second subscriber 60.

The short message 5 could also include a transmission frame 1 comprising precisely two data fields 15, 20; in the first data field 15, the text data with the common ID code 35, 40 are then present, as described, while in the second data field 20, a plurality of data types or media are combined. However, it can also be provided that N data types or media, to be transmitted in the short message 5, are distributed to N or N+1 data fields in the transmission frame 1 of the short message 5. In that case, the first subscriber 60 can download all the data fields of the short message 5 from the network operator 70 either individually or all together.

In the first subscriber 60, an evaluation of the transmitted common ID code 35, 40 can also already be performed, so that their display on the display device of the first subscriber 60 already indicates which data fields of the short message 5 can be downloaded at all from the network operator 70, based on the functionality of the first subscriber 60.

The second subscriber 65 generates a short message 5 in the described transmission frame 1. The generation of a transmission frame 1 in the second subscriber 65 can be done simply by linking together the individual data fields 15, 20, 25, 30, optionally adding to each of them a respective one of the data-field-specific ID codes 45, 50, 55, 75. The network operator 70 in turn receives and stores short messages 5 in memory in the transmission frame 1 described. If the first subscriber 60 has the appropriate functionality, provision can be made for the transmission frame 1 to downloaded in its entirety from the network operator 70 and transmitted to the first subscriber 60. In this case, the first subscriber 60 receives the short message 5 in the transmission frame 1 described, optionally stores it in memory, and/or plays it back in visual and/or acoustical form. The first subscriber 60 receives at least a single data field of the transmission frame 1, optionally stores it in memory, and/or plays it back visually and/or acoustically. An evaluation of received data fields 15, 20, 25, 30 in the network operator 70 and in the first subscriber 60 can for instance be done on the basis of the data-field-specific ID codes 45, 50, 55, 75 if these have been transmitted with the associated data fields 15, 20, 25, 30, or on the basis of the first ID code 35 and/or second ID code 40 if they have been transmitted.

The transmission frame 1 of the invention is not limited to use in a radiotelecommunications network but can also be used in a landline telecommunications network 10, in which case the subscribers 60, 65 and the network operator 70 are also connected by landline. Provision can also be made for one of the two subscribers 60, 65 to be in communication via a landline telecommunications network 10, and for the other of the two subscribers 60, 65 to be in communication via a wireless telecommunications network 10, with the network operator 70, so that the transmission frame 1 is suitable for transmitting short messages 5 both in the landline telecommunications network and the wireless telecommunications network 10.

What is claimed is:

1. A transmission frame (1) for transmitting short messages (5) in a telecommunications network (10) in the form of a radiotelecommunications network, comprising:

at least two data fields (15, 20, 25, 30), wherein data of a short message (5) are stored in memory in the data fields (15, 20, 25, 30), and wherein data in a first data format are stored in a first data field (15) of the short message (5), and data in a second data format, different from the first data format, are stored in a second data field (20) of the short message (5), wherein a first ID code (35), which identifies the makeup of the short message (5), is provided in the first date field (15), wherein the first ID code (35) includes indications about the number of data fields (15, 20, 25, 30) and/or about the data formats in the data fields (15, 20, 25, 30), and/or about the size of the data fields (15, 20, 25, 30), wherein in each of at least two data fields (15, 20.25, 30), one data-field-specific ID code, which identifies the makeup and for content of the corresponding data field (15, 20, 25, 30), per data field is provided.

2. The transmission frame (1) of claim 1, wherein a second ID code (40), which identifies the content of the short message (5), is provided in the first data field (15).

3. The transmission frame (1) of claim 2, wherein the second ID code (40) includes indications about the data type, including audio or image data, of the data stored in the data fields (15, 20, 25, 30).

4. The transmission frame (1) of claim 1, wherein only the first data field (15) is limited in its size to a predetermined value.

5. The transmission frame (1) of claim 1, wherein the data stored in the first data field (15) are present in a data format that is readable by all the subscribers of the telecommunications network (10).

6. The transmission frame (1) claim 1, wherein the data stored in the first data field (15) are in a text format, in accordance with the GSM-SMS format (Global System for Mobile Communications—Short Message Service).

7. The transmission frame (1) claim 1, wherein data are stored In a plurality of data formats In one of the data fields (15, 20, 25, 30).

8. The transmission frame (1) of claim 1, wherein only data in a single data format are stored in each data field (15, 20, 25, 30).

9. A telecommunications device (60, 65, 70), in the for of a radio unit, comprising:

a transmission frame (1) for transmitting short messages (5) in a telecommunications network (10) in the form of a radiotelecommunications network, wherein at least two data fields (15, 20, 25, 30) are provided in the transmission frame (1), wherein data of a short message (5) are stored In memory in the data fields (15, 20, 25, 30), and wherein data in a first data format are stored in a first data field (15) of the short message (5) and data in a second data format, different from the first data format, are stored in a second data field (20) of the short messages (5), wherein a first ID code (35), which identifies the makeup of the short message (5), is provided in the first data field (15), wherein the first ID code (35) includes indications about the number of data fields (15, 20, 25, 30) and/or about the data formats in the data fields (15, 20, 25, 30), and/or about the size of the data fields (15, 20, 25, 30), wherein in each of at least two data fields (15, 20, 25, 30), one data-field-specific ID code, which identifies the makeup and/or content of the corresponding data field (15, 20, 25, 30), per data field is provided.

* * * * *